Figure 1:
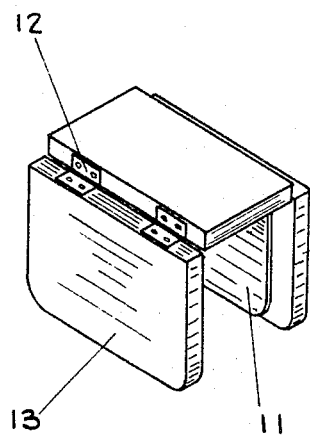

Nov. 1, 1966  C. L. LEVY  3,282,230
PORTABLE SURFACE
Filed Oct. 11, 1965

CAROL L. LEVY
*INVENTOR.*

BY
*Martin R Levy*
AGENT

# United States Patent Office 3,282,230
Patented Nov. 1, 1966

3,282,230
PORTABLE SURFACE
Carol L. Levy, 111A Robert Lane, Wilmington, Del.
Filed Oct. 11, 1965, Ser. No. 494,576
12 Claims. (Cl. 108—28)

This invention relates to a portable surface having a U-bracket as its attaching means.

Surfaces capable of being transported and temporarily affixed to external members by U-brackets are known in the art. U.S. 3,068,048 describes an arm rest-beverage container combination which is suspended by two U-brackets from the back of an automobile seat. U.S. 510,282 describes a surface designed to be affixed to a seat in a railroad train by means of two U-brackets. U.S. 2,693,400 shows a collapsable serving tray which may be affixed to the back of an automobile seat by two U-brackets. The two U-brackets in the prior art devices described above are usually located at the extremities of the surface to be supported and serve only to affix the portable surface to an external member. Also, since the two U-brackets are separate from each other, assembly of a collapsable portable surface requires cross-braces as in U.S. 2,693,400. Such a device is not capable of being molded in one piece, with the result that manufacturing costs are increased.

This invention provides a collapsable, portable surface in which the attaching means is at least one U-bracket which preferably provide a part of the usuable surface, which collapsable surface and bracket are capable of being molded as one unit.

This invention is a portable surface comprising at least one collapsable surface, at least one U-bracket having a connecting member which preferably extends, in the dimension parallel to a collapsing surface edge connected to the U-bracket, a distance which is substantial compared to the length of that edge, which member may also provide a functioning surface, means for flexibly connecting the collapsable surface to the U-bracket and means for maintaining the collapsable surface in extended position.

In a preferred embodiment at least one magnet is integral with the bracket to assist in attaching the bracket to a metallic external member. In another embodiment, at least one magnet is integral with the collapsable surface or surface functioning section of the U-bracket to assist in holding metal objects placed thereon. Preferably, the collapsable surface when extended and surface functioning section of the U-bracket abut and form a continuous surface. In one embodiment, more than one collapsable surface is attached to the U-bracket and preferably forms a continuous surface with the surface functioning section of the U-bracket. The collapsable surface may have other attachments such as a bookstand, recesses for writing utensils, wells for food and beverage containers and the like. In a preferred embodiment, the legs of the U-bracket are spring-loaded or have built in tension to provide tight fit of the bracket to the external member. In a highly preferred embodiment the collapsable surface is hingedly connected to the U-bracket, preferably by a polypropylene hinge, and the collapsable surface is maintained in an extended position by at least one brace affixed thereto, the opposite end of which is inserted in a slot provided therefor in the U-bracket. Alternatively, the braces may be affixed to the legs of the U-bracket with slots provided in the underside of the collapsable surface to receive the opposite ends of the braces. Preferably, the whole item is molded in one piece from a plastic, preferably polypropylene.

By U-bracket is meant a device comprising two leg members substantially parallel to each other when in use, connected to each other by a connecting member which may be molded to the leg members, said three members defining a slot into which an external member is meant to be inserted. By virtue of the geometry, relative movement between the bracket and external member is prevented and the bracket is said to be affixed to the external member.

By usable surface is meant functionally available surface. By collapsable surface is meant that portion of the usable surface provided by the member flexibly connected to the U-bracket.

Figure 2:
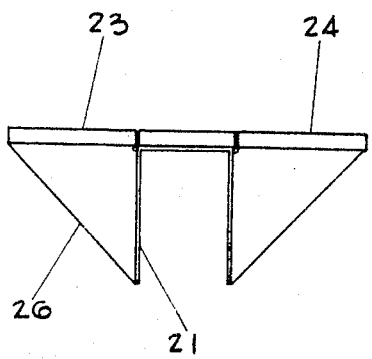
Figure 3:
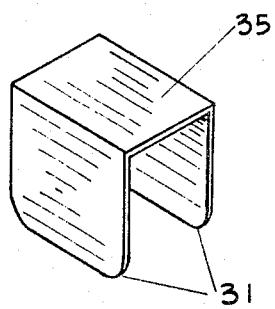

In the figures:
FIGURE 1 shows one embodiment of this invention in the collapsed state.
FIGURE 2 shows that embodiment in the extended state.
FIGURE 3 shows the preferred U-bracket member of this invention.

In FIGURE 1, two collapsable surfaces 13, 14 are shown hingedly connected 12 to a U-bracket. One leg 11 of the U-bracket is visible in this view.

In FIGURE 2, legs 21 correspond to leg 11 in FIGURE 1 and collapsable surfaces 23, 24 correspond to collapsable surfaces 13, 14 in FIGURE 1. Braces 26 to support the collapsable surfaces 23, 24 in the extended position are shown in operable position. In this embodiment, the surface functioning portion of the U-bracket abuts the collapsable surfaces to provide a continuous surface.

FIGURE 3 shows the preferred U-bracket of this invention with legs 31 and a connecting member 35. The connecting member 35 may itself be the surface functioning section of the U-bracket or it may have such a section attached as in FIGURE 2. In either case, however, the connecting member is of a length (perpendicular to the distance between legs of the U-bracket) which is substantial compared to the width (perpendicular to the dimension extending outward of the U-bracket) of the collapsable surface. Preferably, the connecting member is substantially as long as the width of the collapsable surface so as to provide increased rigidity and complete continuity of usable surface, but may be as low as 30% of the collapsable surface width. The legs of the U-bracket need not be solid but are preferably so for added support.

From the figures it is seen that when a plastic hinged means is used and braces are used to maintain the collapsable surface in extended position, this device may be molded in one piece. Polypropylene is the preferred plastic because it is suitable for a hinge device as it can be repeatedly flexed without substantial embrittlement. Furthermore, because of the uses projected for this device, the soil resistance, low growth under hot stress, moisture insensitivity and ease of sterilization of polypropylene make it a preferred material.

This device is suitable for use in hospitals as a bed-tray, in doctors' and dentists' offices as an instrument tray, in ordinary household applications as sink extenders, surfaces affixed to a bathtub to aid in bathing an infant and wherever additional usable surface is desired and the external member exist for affixing this device.

The figures and embodiments herein described are illustrative only. This invention is limited only by the following claims.

I claim:
1. A portable surface comprising at least one collapsable surface, at least one U-bracket having a connecting member which extends in the dimension parallel to a collapsing surface edge connected to the U-bracket a distance which is substantial compared to the length of that edge, which member also provides a functioning surface, flexible means, for connecting the collapsable surface to the U-bracket and means for maintaining the collapsable surface in extended position.

2. The device of claim 1 wherein the collapsable surface in the extended position and the surface functioning section of the U-bracket provide a continuous surface.

3. The device of claim 1 wherein a magnet is integral with the U-bracket to assist in affixing the bracket to an external member.

4. The device of claim 1 wherein a magnet is integral with a usable surface to assist in holding metallic objects thereon.

5. The device of claim 1 wherein the legs of the bracket have built-in tension to provide tight adherence of the legs of the U-bracket to the external member.

6. The device of claim 2 wherein a magnet is integral with the U-bracket to assist in affixing the bracket to an external member.

7. The device of claim 2 wherein a magnet is integral with the usable surface to assist in holding objects thereon.

8. The device of claim 2 wherein the legs of the bracket have built-in tension to provide tight adherence of the legs of the U-bracket to the external member.

9. The device of claim 2 wherein the flexible means is a hinge of polypropylene.

10. The device of claim 1 wherein the flexible means is a hinge of polypropylene.

11. A portable surface comprising at least one collapsable surface, at least one U-bracket, hinged means for flexibly connecting the collapsable surface to the U-bracket and means for maintaining the collapsable surface in extended position, in a one piece construction of a synthetic polymer.

12. The device of claim 11 wherein the polymer is polypropylene.

References Cited by the Examiner

UNITED STATES PATENTS

| | | | |
|---|---|---|---|
| 297,219 | 4/1884 | Anthony | 108—43 |
| 1,725,508 | 8/1929 | Bell-Clifford | 297—194 X |
| 2,647,716 | 8/1953 | Hudziak et al. | 108—43 X |
| 2,686,701 | 8/1954 | Manczur | 108—43 |
| 2,734,788 | 2/1956 | Elles et al. | 108—79 |
| 2,797,973 | 7/1957 | Culpepper | 108—43 X |
| 2,949,334 | 8/1960 | Amerpohl | 108—46 |
| 3,042,467 | 7/1962 | Germick | 108—28 X |
| 3,102,500 | 9/1963 | Shaw | 108—43 |
| 3,185,113 | 5/1965 | Nathan et al. | 108—43 X |

FOREIGN PATENTS 537,241   6/1941   Great Britain.

FRANK B. SHERRY, *Primary Examiner.*

J. T. McCALL, *Assistant Examiner.*